United States Patent
Winebrand et al.

(10) Patent No.: US 10,021,241 B2
(45) Date of Patent: Jul. 10, 2018

(54) SYSTEM, APPARATUS, AND METHOD FOR PROXIMITY DETECTION

(71) Applicant: QUALCOMM Incorporated, San Diego, CA (US)

(72) Inventors: Vadim Winebrand, San Diego, CA (US); Michael Leviant, Binyamina (IL); Meir Agassy, Ramat Gan (IL); Gilad Bornstein, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 15/014,954

(22) Filed: Feb. 3, 2016

(65) Prior Publication Data

US 2017/0223170 A1    Aug. 3, 2017

(51) Int. Cl.
*H04M 1/725* (2006.01)
*H04M 1/60* (2006.01)

(52) U.S. Cl.
CPC ..... *H04M 1/72577* (2013.01); *H04M 1/6008* (2013.01); *H04M 1/6016* (2013.01); *H04M 1/72569* (2013.01)

(58) Field of Classification Search
CPC .......... H04M 2250/12; H04M 3/5116; H04M 2250/22; H04M 9/082; H04M 1/72577; H04M 1/72569; H04W 4/043; H04W 4/02; H04W 4/027; H04W 4/008; H04W 84/12; G01S 5/0289; G01S 5/14
See application file for complete search history.

(56) References Cited

U.S. PATENT DOCUMENTS

| | | | |
|---|---|---|---|
| 6,542,436 B1 | 4/2003 | Myllyla | |
| 8,401,513 B2 | 3/2013 | Langereis et al. | |
| 8,539,382 B2 | 9/2013 | Lyon et al. | |
| 8,848,932 B2 | 9/2014 | Poulsen et al. | |
| 2003/0033879 A1* | 2/2003 | Adewumi | G01N 29/07 73/627 |
| 2008/0084789 A1* | 4/2008 | Altman | G01S 11/16 367/127 |
| 2009/0167542 A1 | 7/2009 | Culbert et al. | |
| 2009/0262078 A1 | 10/2009 | Pizzi | |
| 2011/0003614 A1* | 1/2011 | Langereis | G01S 15/06 455/550.1 |
| 2014/0176467 A1* | 6/2014 | Dahl | G06F 1/3259 345/173 |

FOREIGN PATENT DOCUMENTS

EP    2271134 A1    1/2011

OTHER PUBLICATIONS

International Search Report and Written Opinion—PCT/US2017/012034—ISA/EPO—Mar. 23, 2017.

* cited by examiner

*Primary Examiner* — George Eng
*Assistant Examiner* — Jing Gao
(74) *Attorney, Agent, or Firm* — Muncy, Geissler, Olds & Lowe, P.C./Qualcomm

(57) ABSTRACT

A mobile communication device equipped for proximity detection may include a transmitter that emits a periodic ultrasound signal, a receiver that detects the periodic ultrasound signal, an intra-frame filter that filters the detected periodic ultrasound signal based on a frame length of the detected periodic ultrasound signal, and a detector that determines a power level of the filtered periodic ultrasound signal to detect if the receiver is located in an undesirable location.

28 Claims, 5 Drawing Sheets

SYSTEM, APPARATUS, AND METHOD FOR PROXIMITY DETECTION

FIELD OF DISCLOSURE

This disclosure relates generally mobile communication devices, and more specifically, but not exclusively, proximity detection for mobile communication devices.

BACKGROUND

Mobile communications devices have become very prevalent today and are in wide spread use for a number of applications including voice communication. The mobile aspect of the communication device allows users to carry the communication device with them or on their person. Typically, when a user is carrying the mobile communication device but not actively using the device, the user carries the device in their pocket or handbag. Unfortunately, this method of carrying the device can result in unintentional activation of the device—also known as "pocket dialing." In other words, when the device is carried on the user, such as in a pocket, the device is susceptible to accidental activation, such as dialing a phone number. This type of accidental activation is undesirable.

In an attempt to avoid such accidental activations, some devices are equipped with an infrared sensor able to detect when the device is in an enclosed environment such as a pocket or handbag. When the infrared sensor detects the enclosed environment, it may be able to prevent activation and avoid "pocket dialing." However, the addition of an infrared sensor to the mobile communication device adds additional cost to the device along with another potential point of failure (i.e. the infrared sensor).

Accordingly, there is a need for systems, apparatus, and methods that improve upon conventional approaches including the methods, system and apparatus provided hereby.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, a mobile communication device includes a transmitter configured to transmit a periodic ultrasound signal; a receiver configured to receive the periodic ultrasound signal; a first filter coupled to the receiver and configured to filter the periodic ultrasound signal based on a frame length of the periodic ultrasound signal; and a detection logic coupled to the first filter and configured to determine a power level of the periodic ultrasound signal, a signal to noise ratio of the periodic ultrasound signal, and if the receiver is located in an enclosed environment based on the power level and the signal to noise ratio.

In another aspect, a computer program product residing on a processor-executable non-transitory storage medium, the computer program product comprising processor-executable instructions configured to cause: a transmitter to transmit a periodic ultrasound signal; a receiver to receive the periodic ultrasound signal; a first filter, coupled to the receiver, to filter the periodic ultrasound signal based on a frame length of the periodic ultrasound signal; and a detection logic, coupled to the first filter, to determine a power level of the periodic ultrasound signal, a signal to noise ratio of the periodic ultrasound signal, and if the receiver is located in an enclosed environment based on the power level and the signal to noise ratio.

In still another aspect, a method for detection of an enclosed environment includes: transmitting a periodic ultrasound signal from a transmitter; receiving the periodic ultrasound signal by a receiver; filtering of the periodic ultrasound signal by a first filter based on a frame length of the periodic ultrasound signal; determining if a threshold power level is exceeded in the periodic ultrasound signal; determining if a threshold signal to noise ratio is exceeded in the periodic ultrasound signal; and determining the receiver is in an enclosed environment based on a power level and a signal to noise ratio of the periodic ultrasound signal and preventing an initiation of a communication session.

In still another aspect, a system for detection of an enclosed environment includes: a transmitter configured to transmit a periodic ultrasound signal with a frequency in a transmitted pattern range; a receiver configured to receive the periodic ultrasound signal; a first filter coupled to the receiver and configured to filter the periodic ultrasound signal based on a frame length of the periodic ultrasound signal; a second filter coupled to the first filter and configured to filter the periodic ultrasound signal between a frequency range of approximately the transmitted pattern range; and a detection logic coupled to the second filter and configured to determine a power level of the periodic ultrasound signal, a signal to noise ratio of the periodic ultrasound signal, and if the receiver is located in an enclosed environment based on the power level and the signal to noise ratio.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1:
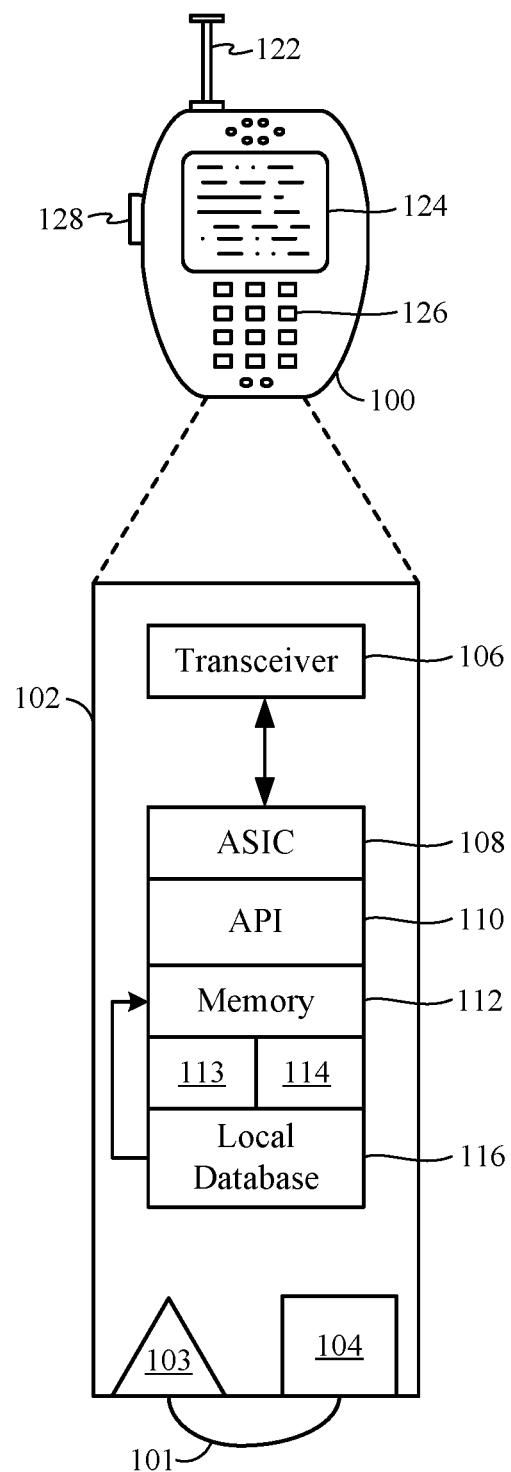
FIG. 1 illustrates exemplary user equipment (UE) in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein address the industry needs, as well as other previously unidentified needs, and mitigate shortcomings of the conventional methods, apparatus, and systems. For example, a mobile communication device may use a speaker/earpiece to transmit an ultrasound signal to a microphone that receives the ultrasound signal, an intra-frame filter that filters the received signal, and a proximity detection logic that determines if the mobile communication device is in an enclosed environment, such as a pocket, based on a power level of the filtered ultrasound signal and a signal to noise ratio of the filtered ultrasound signal.

In this description, certain terminology is used to describe certain features. The term "mobile device" can describe, and is not limited to, a mobile phone, a mobile communication device, a pager, a personal digital assistant, a personal information manager, a mobile hand-held computer, a wireless device, a wireless modem, and/or other types of portable electronic devices typically carried by a person and/or having communication capabilities (e.g., wireless, cellular, infrared, short-range radio, etc.). Further, the terms "user equipment" (UE), "mobile terminal," "mobile device," and "wireless device," can be interchangeable.

Referring to FIG. 1, a mobile communication device may include a UE 100, such as a wireless device, which has a platform 102 that can receive and execute software applications, data and/or commands transmitted from a radio access network (RAN) that may ultimately come from a core network, the Internet and/or other remote servers and networks. Platform 102 can include a transmitter 103 (e.g. an earpiece or speaker) configured to transmit a periodic ultrasound signal 101, a receiver 104 (e.g. a microphone) configured to receive the periodic ultrasound signal 101, a transceiver 106 operably coupled to an application specific integrated circuit ("ASIC" 108), or other processor, microprocessor, logic circuit, or other data processing device. ASIC 108 or other processor executes the application programming interface ("API") 110 layer that interfaces with any resident programs in memory 112 of the wireless device. Memory 112 can be comprised of read-only or random-access memory (RAM and ROM), EEPROM, flash cards, or any memory common to computer platforms. Platform 102 may also include a first filter 113 (e.g. an intra-frame filter) coupled to the receiver 104 and configured to filter the periodic ultrasound signal 101 as described in more detail below, a proximity detection logic 114 coupled to the first filter 113 and configured to determine a signal to noise ratio and power of the periodic ultrasound signal 101 as described in more detail below, and a local database 116 that can hold applications not actively used in memory 112. Local database 116 is typically a flash memory cell, but can be any secondary storage device as known in the art, such as magnetic media, EEPROM, optical media, tape, soft or hard disk, or the like. Internal platform 102 components can also be operably coupled to external devices such as antenna 122, display 124, push-to-talk button 128 and keypad 126 among other components, as is known in the art.

Accordingly, an example of the disclosure may include a UE including the ability to perform the functions described herein. As will be appreciated by those skilled in the art, the various logic elements can be embodied in discrete elements, software modules executed on a processor or any combination of software and hardware to achieve the functionality disclosed herein. For example, the ASIC 108, the first filter 113, and the proximity detection logic 114 may all be used cooperatively to execute the various functions disclosed herein and thus the logic to perform these functions may be distributed over various elements. Alternatively, the functionality could be incorporated into one discrete component. While the UE 100 is shown with a single transmitter 103 and a single receiver 104 on the same side or near each other, it should be understood that the transmitter 103 and receiver 104 may be located further apart or on different sides of the UE 100 and may include more than one transmitter 103 and/or receiver 104. Therefore, the features of UE 100 in FIG. 1 are to be considered merely illustrative and the disclosure is not limited to the illustrated features or arrangement.

The wireless communication between UE 100 and the RAN can be based on different technologies, such as code division multiple access (CDMA), W-CDMA, time division multiple access (TDMA), frequency division multiple access (FDMA), Orthogonal Frequency Division Multiplexing (OFDM), Global System for Mobile Communications (GSM), 3GPP Long Term Evolution (LTE) or other protocols that may be used in a wireless communications network or a data communications network.

Figure 2A:
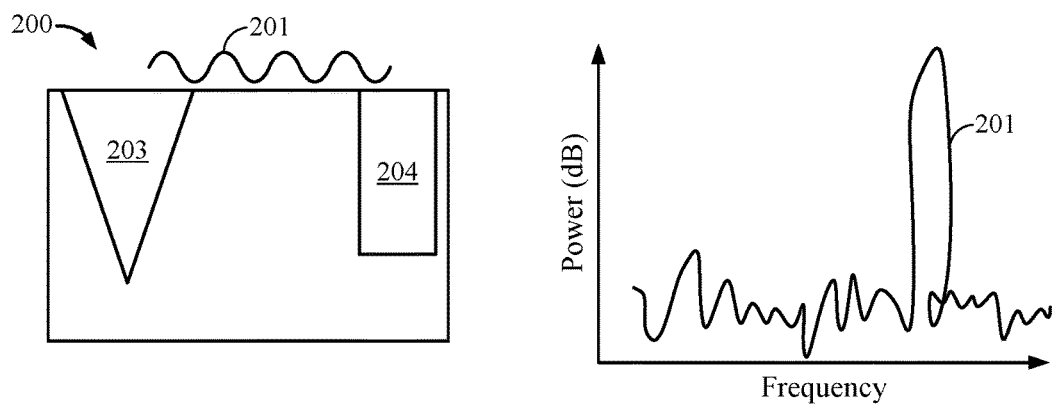
FIG. 2A illustrates an exemplary UE in an open environment in accordance with some examples of the disclosure.

FIG. 2A illustrates an exemplary UE in an open environment in accordance with some examples of the disclosure. As shown, a UE 200 may include a transmitter 203 configured to transmit a periodic ultrasound signal 201 and a receiver 204 configured to receive the periodic ultrasound signal 201. When the UE 200 is in an open environment, the periodic ultrasound signal 201 is received by the receiver 204 with very little attenuation. The central frequency and power of the periodic ultrasound signal 201 may be selected such that a leakage (the amount of signal that travels within a volume of the UE 200 internally and received by the receiver 204) would be minimized while keeping the transmitter non-saturated, the frequency is above audible levels of a person to avoid creating a nuisance noise sound, a low peak to root mean square (RMS) value to set the maximum gain, an adequate power level to maintain a feasible SNR, and a frequency band range to reduce the leakage to minimum and maintain high SNR. For example, the frequency band range of the periodic ultrasound signal 201 may be selected as approximately 55 KHz to 65 KHz with a target central frequency of 60 KHz to 60.5 KHz. As shown in graph of FIG. 2A, the power of the periodic ultrasound signal 201 will be significant in this frequency band when the UE 200 is in an open environment that does not attenuate the signal between the transmitter 203 and the receiver 204. This significant power level will allow accurate determination of the open environment. While the ultrasound signal 201 is described as periodic, it should be understood that the signal may be continuous at the cost of additional power for the transmission and processing of the received signal.

Figure 2B:
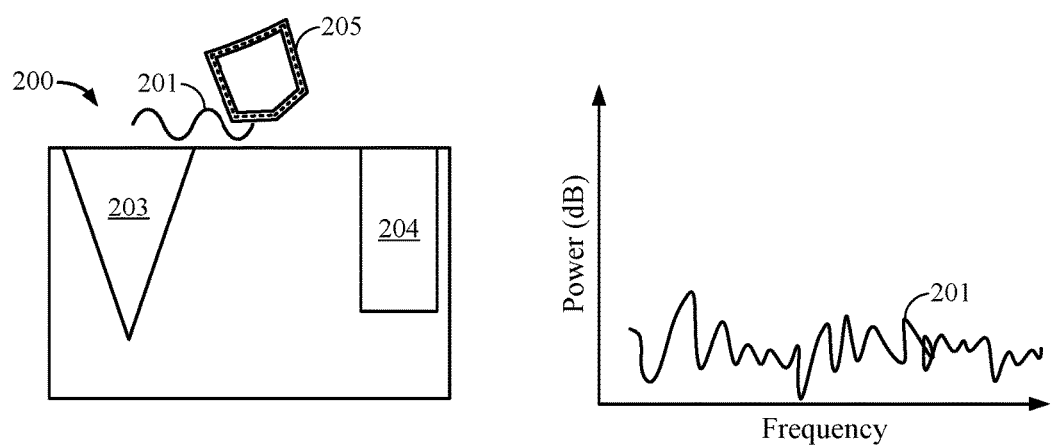
FIG. 2B illustrates an exemplary UE in an enclosed environment in accordance with some examples of the disclosure.

FIG. 2B illustrates an exemplary UE in an enclosed environment in accordance with some examples of the disclosure. As shown, a UE 200 may include a transmitter 203 configured to transmit a periodic ultrasound signal 201 and a receiver 204 configured to receive the periodic ultrasound signal 201. When the UE 200 is in an enclosed environment 205 (e.g. a pants or shirt pocket, a handbag, etc.), the periodic ultrasound signal 201 is blocked or attenuated before being received by the receiver 204. As shown in graph of FIG. 2B, the power of the attenuated periodic ultrasound signal 201 will be not be significant when the UE 200 is in a closed environment that does attenuate the signal between the transmitter 203 and the receiver 204. This lack of a significant power level in the received periodic ultrasound signal will allow accurate determination of the enclosed environment. When the enclosed environment is detected, the UE 200 may prevent the initiation of activation or a communication session, such as a voice call.

Figure 3:
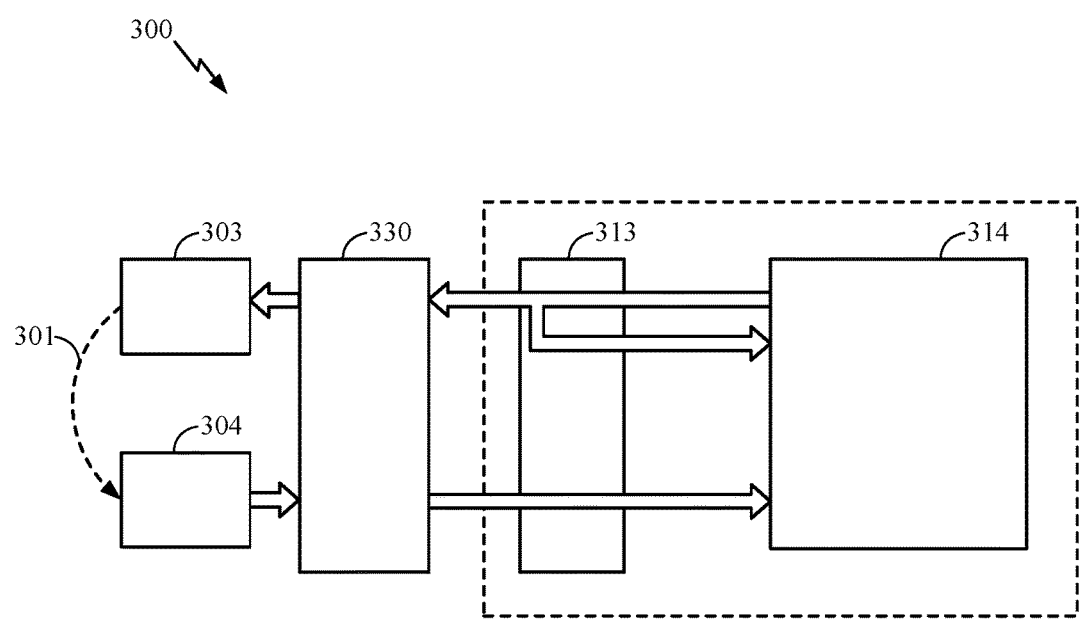
FIG. 3 illustrates an exemplary UE with compensation mechanisms for signal delay in accordance with some examples of the disclosure.

FIG. 3 illustrates an exemplary UE with compensation mechanisms for signal delay in accordance with some examples of the disclosure. As shown, a UE 300 may include a transmitter 303 configured to transmit a periodic ultrasound signal 301 and a receiver 304 configured to receive the periodic ultrasound signal 301, a codec 330 coupled to the transmitter 303 and receiver 304 and configured to compress and decompress the periodic ultrasound signal 301, a first filter 313 coupled to the codec 330 and configured to sample and filter the received periodic ultrasound signal 301, and a proximity detection logic 314 coupled to the first filter 313 and configured to detect a power level and a signal to noise ratio of the received periodic ultrasound signal 301 and then determine if the UE 300 is located in a closed or open environment based on the detected power level and signal to noise ratio of the periodic ultrasound signal 301 after filtering. The proximity detection logic 314 may also be configured to stabilize the receiver 304 and compensate for signal delay as the periodic ultrasound signal 301 propagates from the transmitter 303 through the UE 300. Prior to the start of the detection operation of UE 300, the proximity detection logic 314 may initiate a stabilization process for the receiver 304 to stabilize the operation for receipt of the periodic ultrasound signal 301. The proximity detection logic 314 may also initiate a delay compensation process to synchronize between reception and transmission patterns of the periodic ultrasound signal 301 at proximity detection logic for accurate processing.

For example, the proximity detection logic 314 may use a sampling rate of 192 kHz of the periodic ultrasound signal 301 and a continuous periodic frame pattern of 1024 samples (e.g. eight continuous frames of 1024 samples). In a first phase, a delay compensation is determined between a reception (RX) and reception reference (RX_REF) by looking for the RX pattern start in a RX_REF signal. In a second phase, a delay compensation is determined between RX_REF and a transmission (TX) using a timestamp mechanism to evaluate the time data between the two. In a third phase, the codec 330 may be configured to compensate for the determined delays based on the first and second phase. In a fourth phase, the propagation delay over air is compensated by determining the receiver 304 distance from the transmitter 303 times frequency sampling rate (e.g. 192 KHz) divided by the speed of sound (e.g. 343.2 meters/second). The compensation process may be executed every time before proximity detection starts. This will allow an accurate determination of the power level and signal to noise ratio of the received periodic ultrasound signal 301.

Figure 4:
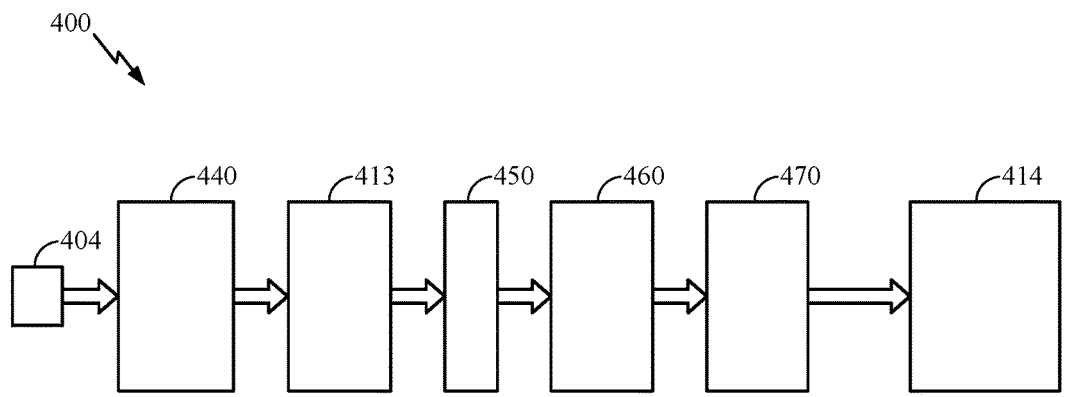
FIG. 4 illustrates a block diagram of proximity detection in accordance with some examples of the disclosure.

FIG. 4 illustrates a block diagram of proximity detection in accordance with some examples of the disclosure. As shown, a proximity detection system 400 may include a receiver 404 configured to receive a periodic ultrasound signal, a receiver compensation logic 440 coupled to the receiver 404 and configured to compensate for signal delay and stabilize the receiver 404 (such as described with reference to FIG. 3), a filter 413 coupled to the receiver compensation logic 440 and configured to filter the periodic ultrasound signal (e.g. first filter 113 and first filter 313), a second filter 450 (e.g. bandpass filter for a frequency range of 55 KHz to 65 KHz or 60 KHz to 60.5 KHz) coupled to the first filter 413 and configured to filter the periodic ultrasound signal in a selected frequency range or band, a power and signal to noise estimator 460 coupled to the second filter 450 and configured to determine a power and signal to noise ratio of the periodic ultrasound signal, a buffering mechanism 470 coupled to the power and signal to noise estimator 460 and configured to buffer the periodic ultrasound signal, and a proximity detection logic 414 coupled to the buffer and configured to determine if the proximity detection system 400 is in a closed environment or an open environment based on the power and signal to noise ratio of the periodic ultrasound signal.

Figure 5:
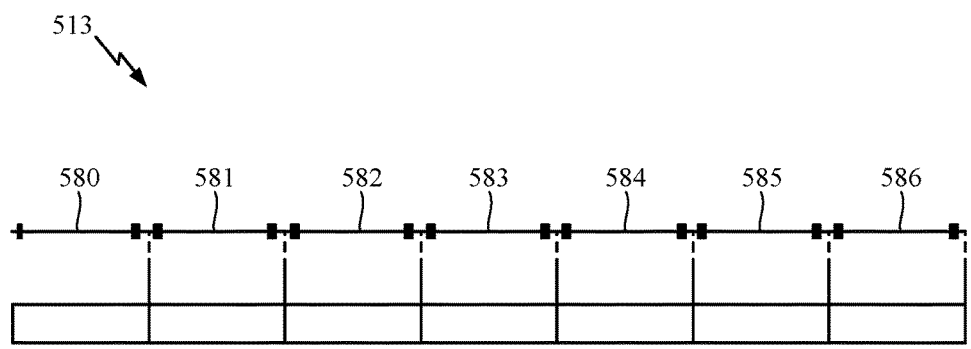
FIG. 5 illustrates an intra-frame filter in accordance with some examples of the disclosure.

FIG. 5 illustrates an intra-frame filter in accordance with some examples of the disclosure. As shown, a first filter 513 (e.g. first filter 113, first filter 313, and first filter 413) may be configured to filter a periodic ultrasound signal by sampling multiple frames with each frame comprised of a number of samples with a periodicity length that may be any pattern length. For example, each frame may be comprised of 1024 samples of the periodic ultrasound signal based on a periodic pattern of the ultrasound signal with a cycle length of 1024. For example, a first frame 580 may include the first 1024 samples of the periodic ultrasound signal, a second frame 581 may include the second 1024 samples of the periodic ultrasound signal, a third frame 582 may include the third 1024 samples of the periodic ultrasound signal, a fourth frame 583 may include the fourth 1024 samples of the periodic ultrasound signal, a fifth frame 584 may include the fifth 1024 samples of the periodic ultrasound signal, a sixth frame 585 may include the sixth 1024 samples of the periodic ultrasound signal, and a seventh frame 586 may include the seventh 1024 samples of the periodic ultrasound signal. While 7 frames are described, it should be understood that more or less frames may be used based on the system latency requirements.

For example, at a receiver (e.g. receiver 104, receiver 304, receiver 404) it may be assumed that every $k^{th}$ ($0<=k<1024$) sample within a frame to be identical among the frames; $k^{th}$ sample will be identical in the first frame 580, the second frame 581, the third frame 582, the fourth frame 583, the fifth frame 584, the sixth frame 585, and the seventh frame 586. However, in a noisy environment, that might not be true because noise will cause the samples to fluctuate. Using the equation (equation 1): $S_{k,m} = C_k + n_{k,m}$ where K is a sample within a frame and m is a frame number. Every $k^{th}$ sample within a frame will be equal to some constant $C_k$ plus noise. In overall, there are 1024 constants as the frame length. The noise addition will be different in each frame. The noise in closed environment only comes from the transmitter and receiver electrical noise. The first filter 513 filters out the noise $n_{k,m}$ to recover the constant $C_k$. Since the constant is a DC value, and the noise is a random wideband signal, to filter out the noise, an intra-frame low-pass filter may be applied. To illustrate one example, the following matrix may be used (equation 2):

$$\begin{pmatrix} S_{1,1} & S_{1,2} & S_{1,3} & \ldots & S_{1,N} \\ S_{2,1} & S_{2,2} & S_{2,3} & \ldots & S_{2,N} \\ S_{3,1} & S_{3,2} & S_{3,3} & \ldots & S_{3,N} \\ S_{4,1} & S_{4,2} & S_{4,3} & \ldots & S_{4,N} \\ \vdots & \vdots & \vdots & \ddots & \vdots \\ S_{1024,1} & S_{1024,2} & S_{1024,3} & \ldots & S_{1024,N} \end{pmatrix}$$

The matrix is generated from the received samples and configured such that every column represents a frame, and every row represents a sample within the frame. Column number 1 represents frame 580, column number 2 represents frame 581, and so on. Row number 1 represents the first sample within frame 580, row number 2 represents the second sample within frame 581 and so on. The number of rows will be equal to the frame length 1024, and the number of columns will be equal to the desired filter length N.

Combining equation 1 and equation 2, we can rewrite the matrix as follows (equation 3):

$$\begin{pmatrix} C_1 + n_{1,1} & C_1 + n_{1,2} & C_1 + n_{1,3} & \ldots & C_1 + n_{1,N} \\ C_2 + n_{2,1} & C_2 + n_{2,2} & C_2 + n_{2,3} & \ldots & C_2 + n_{2,N} \\ C_3 + n_{3,1} & C_3 + n_{3,2} & C_3 + S_{3,3} & \ldots & C_3 + n_{3,N} \\ C_4 + n_{4,1} & C_4 + n_{4,2} & C_4 + n_{4,3} & \ldots & C_4 + n_{4,N} \\ \vdots & \vdots & \vdots & \ddots & \ldots \\ C_{1024} + n_{1024,1} & C_{1024} + n_{1024,2} & C_{1024} + n_{1024,3} & \ldots & C_{1024} + n_{1024,N} \end{pmatrix}$$

Each row will be filtered with a low pass filter. The low pass filter will be applied on each row. The filter is executed 1024 times, and the input length to each execution is N samples. The filter 513 filters out the noise and the outcome of the each execution is the constant $C_k$. The outcome of the operation will be a column vector where each row will represent the recovered constant (equation 4):

$$\begin{pmatrix} C_1 \\ C_2 \\ C_3 \\ \vdots \\ C_{1024} \end{pmatrix}$$

Figure 6:
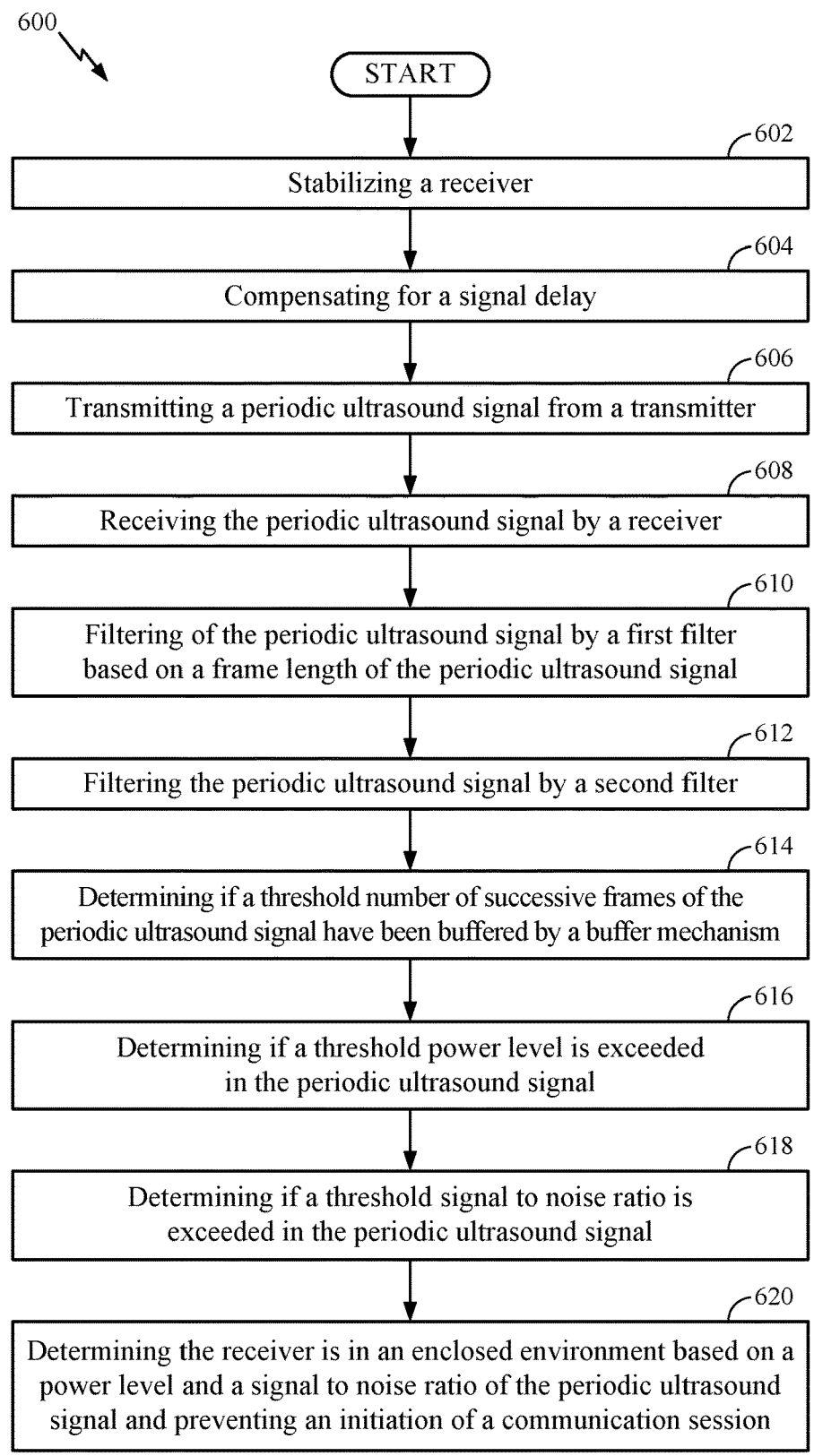
FIG. 6 illustrates a method of proximity detection in accordance with some examples of the disclosure.

FIG. 6 illustrates a partial method for proximity detection in accordance with some examples of the disclosure. As shown, the partial method 600 for proximity detection begins in block 602 with stabilizing a receiver (e.g. receiver 104, receiver 204, receiver 304, and receiver 404). Next in block 604, the method 600 continues with compensating for signal delay. Next in block 606, the method 600 continues with transmitting a periodic ultrasound signal (e.g. periodic ultrasound signal 101, periodic ultrasound signal 201, and periodic ultrasound signal 301) from a transmitter (e.g. transmitter 103, transmitter 203, and transmitter 303). Next in block 608, the method 600 continues with receiving the periodic ultrasound signal by the receiver. Next in block 610, the method 600 continues with filtering of the periodic ultrasound signal by a first filter (e.g. first filter 113, first filter 313, first filter 413, and first filter 513) based on a frame length of the periodic ultrasound signal. Next in block 612, the method 600 continues with filtering of the periodic ultrasound signal by a second filter (e.g. second filter 450). Next in block 614, the method 600 continues with determining if a threshold number of successive frames of the periodic ultrasound signal have been buffered by a buffer mechanism (e.g. buffer mechanism 470). If the threshold number of successive frames of the periodic ultrasound signal has been buffered, the method continues in block 616 with determining if a threshold power level is exceeded in the periodic ultrasound signal. If the threshold power level is not exceeded, the method continues in block 620, otherwise the method continues in block 618. If the threshold power level is not exceeded in the periodic ultrasound signal, the method continues in block 618 with determining if a threshold signal to noise ratio is exceeded in the periodic ultrasound signal. If the threshold signal to noise ratio is exceeded, the process concludes with no change since the receiver is determined to be in an open environment. Next in block 620, the method 600 concludes with determining the receiver is in an enclosed environment based on a power level and a signal to noise ratio of the periodic ultrasound signal and preventing an initiation of a communication session, such as a voice call.

The methods, sequences and/or algorithms described in connection with the examples disclosed herein may be embodied directly in hardware, in a software executed by a processor or logic (e.g. ASIC 108 or proximity detection logic 114), or in a combination of the two. The software may reside in RAM memory, flash memory, ROM memory, EPROM memory, EEPROM memory, registers, hard disk, a removable disk, a CD-ROM, or any other form of storage medium known in the art including a non-transitory recordable medium. An exemplary storage medium is coupled to the processor or logic such that the processor or logic can read information from, and write information to, the storage medium. In the alternative, the storage medium may be integral to the processor or logic.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration)

The word "exemplary" is used herein to mean "serving as an example, instance, or illustration." Any details described herein as "exemplary" is not necessarily to be construed as preferred or advantageous over other examples. Likewise, the term "examples" does not require that all examples include the discussed feature, advantage or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples only and is not intended to be limiting of examples of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, actions, operations, elements, and/or components, but do not preclude the presence or addition of one or more other features, integers, actions, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must necessarily precede the second element. Also, unless stated otherwise, a set of elements can comprise one or more elements.

Nothing stated or illustrated depicted in this application is intended to dedicate any component, action, feature, benefit, advantage, or equivalent to the public, regardless of whether the component, action, feature, benefit, advantage, or the equivalent is recited in the claims.

In the detailed description above it can be seen that different features are grouped together in examples. This manner of disclosure should not be understood as an intention that the claimed examples require more features than are explicitly mentioned in the respective claim. Rather, the situation is such that inventive content may reside in fewer than all features of an individual example disclosed. Therefore, the following claims should hereby be deemed to be incorporated in the description, wherein each claim by itself can stand as a separate example. Although each claim by itself can stand as a separate example, it should be noted that-although a dependent claim can refer in the claims to a specific combination with one or a plurality of claims-other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods disclosed in the description or in the claims can be implemented by a device comprising means for performing the respective actions of this method.

While the foregoing disclosure shows illustrative examples of the disclosure, it should be noted that various changes and modifications could be made herein without departing from the scope of the disclosure as defined by the appended claims. The functions and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A mobile communication device, comprising:
    a transmitter configured to transmit a periodic ultrasound signal;
    a receiver configured to receive the periodic ultrasound signal, the receiver located remote from the transmitter;
    a first filter coupled to the receiver and configured to filter the periodic ultrasound signal based on a frame length of the periodic ultrasound signal; and
    a detection logic circuit coupled to the first filter and configured to determine a power level of the periodic ultrasound signal, a signal to noise ratio of the periodic ultrasound signal, and whether the receiver is located in an enclosed environment based on the power level and the signal to noise ratio;
    wherein the first filter is configured to filter the periodic ultrasound signal by using a matrix wherein each column of the matrix represents one of a first frame, a second frame, a third frame, a fourth frame, a fifth frame, a sixth frame, and a seventh frame and each row of the matrix represents one of a first 1024 samples, a second 1024 samples, a third 1024 samples, a fourth 1024 samples, a fifth 1024 samples, a sixth 1024 samples, and a seventh 1024 samples, respectively.

2. The mobile communication device of claim 1, wherein the first filter is configured to sample the periodic ultrasound signal at a sampling rate of 192 KHz and the frame length is 1024 samples of the periodic ultrasound signal.

3. The mobile communication device of claim 2, wherein the first filter is configured to filter the periodic ultrasound signal after reception of the first frame comprising the first 1024 samples of the periodic ultrasound signal, the second frame comprising the second 1024 samples of the periodic ultrasound signal, the third frame comprising the third 1024 samples of the periodic ultrasound signal, the fourth frame comprising the fourth 1024 samples of the periodic ultrasound signal, the fifth frame comprising the fifth 1024 samples of the periodic ultrasound signal, the sixth frame comprising the a sixth 1024 samples of the periodic ultrasound signal, and the seventh frame comprising the seventh 1024 samples of the periodic ultrasound signal.

4. The mobile communication device of claim 1, further comprising a second filter coupled between the first filter and the detection logic circuit and configured to filter the periodic ultrasound signal between a frequency range of 55 KHz to 65 KHz.

5. The mobile communication device of claim 1, wherein the periodic ultrasound signal has a central frequency between 60 KHz and 60.5 KHz.

6. The mobile communication device of claim 1, wherein the transmitter is a speaker.

7. The mobile communication device of claim 1, wherein the receiver is a microphone.

8. The mobile communication device of claim 1, wherein the transmitter is located on a same side of the mobile communication device as the receiver.

9. The mobile communication device of claim 1, wherein the detection logic circuit is further configured to stabilize the receiver prior to reception of the periodic ultrasound signal.

10. The mobile communication device of claim 1, wherein the detection logic circuit is further configured to compensate for a signal delay of the periodic ultrasound signal.

11. A computer program product residing on a processor-executable non-transitory storage medium, the computer program product comprising processor-executable instructions configured to cause:
- a transmitter to transmit a periodic ultrasound signal;
- a receiver to receive the periodic ultrasound signal, the receiver located remote from the transmitter;
- a first filter, coupled to the receiver, to filter the periodic ultrasound signal based on a frame length of the periodic ultrasound signal; and
- a detection logic circuit, coupled to the first filter, to determine a power level of the periodic ultrasound signal, a signal to noise ratio of the periodic ultrasound signal, and whether the receiver is located in an enclosed environment based on the power level and the signal to noise ratio;
- wherein the first filter is configured to filter the periodic ultrasound signal by using a matrix wherein each column of the matrix represents one of a first frame, a second frame, a third frame, a fourth frame, a fifth frame, a sixth frame, and a seventh frame and each row of the matrix represents one of a first 1024 samples, a second 1024 samples, a third 1024 samples, a fourth 1024 samples, a fifth 1024 samples, a sixth 1024 samples, and a seventh 1024 samples, respectively.

12. The computer program product of claim 11, wherein the processor-executable instructions are further configured to cause the first filter to sample the periodic ultrasound signal at a sampling rate of 192 KHz with the frame length of 1024 samples of the periodic ultrasound signal.

13. The computer program product of claim 12, wherein the processor-executable instructions are further configured to cause the first filter to filter the periodic ultrasound signal after reception of the first frame comprising the first 1024 samples of the periodic ultrasound signal, the second frame comprising the second 1024 samples of the periodic ultrasound signal, the third frame comprising the third 1024 samples of the periodic ultrasound signal, the fourth frame comprising the fourth 1024 samples of the periodic ultrasound signal, the fifth frame comprising the fifth 1024 samples of the periodic ultrasound signal, the sixth frame comprising a sixth 1024 samples of the periodic ultrasound signal, and the seventh frame comprising the seventh 1024 samples of the periodic ultrasound signal.

14. The computer program product of claim 11, wherein the processor-executable instructions are further configured to cause a second filter, coupled between the first filter and the detection logic circuit, to filter the periodic ultrasound signal between a frequency range of 55 KHz to 65 KHz.

15. The computer program product of claim 11, wherein the periodic ultrasound signal has a central frequency between 60 KHz and 60.5 KHz.

16. The computer program product of claim 11, wherein the transmitter is a speaker.

17. The computer program product of claim 11, wherein the receiver is a microphone.

18. The computer program product of claim 11, wherein the transmitter is located on a same side of a mobile communication device as the receiver.

19. The computer program product of claim 11, wherein the processor-executable instructions are further configured to cause the detection logic circuit to stabilize the receiver prior to reception of the periodic ultrasound signal.

20. The computer program product of claim 11, wherein the processor-executable instructions are further configured to cause the detection logic circuit to compensate for a signal delay of the periodic ultrasound signal.

21. A method for detection of an enclosed environment, the method comprising:
- transmitting a periodic ultrasound signal from a transmitter;
- receiving the periodic ultrasound signal by a receiver, the receiver located remote from the transmitter;
- filtering of the periodic ultrasound signal by a first filter based on a frame length of the periodic ultrasound signal; determining whether a threshold power level is exceeded in the periodic ultrasound signal;
- determining whether a threshold signal to noise ratio is exceeded in the periodic ultrasound signal; and
- determining whether the receiver is in the enclosed environment based on a power level and a signal to noise ratio of the periodic ultrasound signal;
- and preventing an initiation of a communication session based upon the determination of whether the receiver is in the enclosed environment;
- wherein the first filter is configured to filter the periodic ultrasound signal by using a matrix wherein each column of the matrix represents one of a first frame, a second frame, a third frame, a fourth frame, a fifth frame, a sixth frame, and a seventh frame and each row of the matrix represents one of a first 1024 samples, a second 1024 samples, a third 1024 samples, a fourth 1024 samples, a fifth 1024 samples, a sixth 1024 samples, and a seventh 1024 samples, respectively.

22. The method for detection of claim 21, further comprising stabilizing the receiver.

23. The method for detection of claim 21, further comprising compensating for a signal delay.

24. The method for detection of claim 21, further comprising filtering the periodic ultrasound signal by a second filter.

25. The method for detection of claim 21, further comprising determining whether a threshold number of successive frames of the periodic ultrasound signal have been buffered by a buffer mechanism.

26. A system for detection of an enclosed environment, the system comprising:
- a transmitter configured to transmit a periodic ultrasound signal with a frequency in a transmitted pattern range;
- a receiver configured to receive the periodic ultrasound signal, the receiver located remote from the transmitter;
- a first filter coupled to the receiver and configured to filter the periodic ultrasound signal based on a frame length of the periodic ultrasound signal;
- a second filter coupled to the first filter and configured to filter the periodic ultrasound signal between a frequency range of the transmitted pattern range; and
- a detection logic circuit coupled to the second filter and configured to determine a power level of the periodic ultrasound signal, a signal to noise ratio of the periodic ultrasound signal, and whether the receiver is located in the enclosed environment based on the power level and the signal to noise ratio;
- wherein the first filter is configured to filter the periodic ultrasound signal by using a matrix wherein each column of the matrix represents one of a first frame, a second frame, a third frame, a fourth frame, a fifth frame, a sixth frame, and a seventh frame and each row of the matrix represents one of a first 1024 samples, a second 1024 samples, a third 1024 samples, a fourth 1024 samples, a fifth 1024 samples, a sixth 1024 samples, and a seventh 1024 samples, respectively.

27. The system of claim 26, wherein the first filter is configured to sample the periodic ultrasound signal at a sampling rate of 192 KHz and the frame length is 1024 samples of the periodic ultrasound signal, and the transmitted pattern range is 55 KHz to 65 KHz.

28. The system of claim 27, wherein the first filter is configured to filter the periodic ultrasound signal after reception of the first frame comprising the first 1024 samples of the periodic ultrasound signal, the second frame comprising the second 1024 samples of the periodic ultrasound signal, the third frame comprising the third 1024 samples of the periodic ultrasound signal, the fourth frame comprising the fourth 1024 samples of the periodic ultrasound signal, the fifth frame comprising the fifth 1024 samples of the periodic ultrasound signal, the sixth frame comprising the sixth 1024 samples of the periodic ultrasound signal, and the seventh frame comprising the seventh 1024 samples of the periodic ultrasound signal.

* * * * *